United States Patent
Bogdan

(10) Patent No.: US 6,169,546 B1
(45) Date of Patent: Jan. 2, 2001

(54) GLOBAL VIEWER SCROLLING SYSTEM

(75) Inventor: Jeffrey L. Bogdan, Redmond, WA (US)

(73) Assignee: Microsoft Corporation, Redmond, WA (US)

( * ) Notice: Under 35 U.S.C. 154(b), the term of this patent shall be extended for 0 days.

(21) Appl. No.: 09/053,615

(22) Filed: Apr. 1, 1998

(51) Int. Cl.$^7$ ........................................ G06F 3/14
(52) U.S. Cl. ..................... 345/339; 345/341; 345/342; 700/17
(58) Field of Search ................... 700/17, 18, 19, 700/56, 57, 60, 61, 62, 63, 65, 66; 345/15, 123, 340, 341, 353, 433–435, 129–131, 961, 964, 121, 125, 127, 118, 333–335, 339, 342–346, 439; 709/312–313, 315, 316, 331, 332

(56) References Cited

U.S. PATENT DOCUMENTS

| | | | |
|---|---|---|---|
| 4,916,656 | 4/1990 | Sasaki | 364/900 |
| 5,191,644 * | 3/1993 | Takeda | 345/344 |
| 5,237,654 | 8/1993 | Shakelford et al. | 395/160 |
| 5,312,478 | 5/1994 | Reed et al. | 395/148 |
| 5,339,391 | 8/1994 | Wroblewski et al. | 395/157 |
| 5,371,846 | 12/1994 | Bates | 395/157 |
| 5,388,196 | 2/1995 | Pajak et al. | 395/153 |
| 5,402,152 | 3/1995 | Needham | 345/179 |
| 5,418,549 | 5/1995 | Anderson et al. | 345/145 |
| 5,452,406 | 9/1995 | Butler et al. | 395/126 |
| 5,479,600 | 12/1995 | Wroblewski et al. | 395/157 |
| 5,506,951 | 4/1996 | Ishikawa | 395/157 |
| 5,517,603 | 5/1996 | Kelley et al. | 395/126 |
| 5,526,480 | 6/1996 | Gibson | 395/154 |
| 5,528,735 | 6/1996 | Strasnick et al. | 395/127 |
| 5,532,715 | 7/1996 | Bates et al. | 345/123 |
| 5,548,703 | 8/1996 | Berry et al. | 395/160 |
| 5,553,225 | 9/1996 | Perry | 395/157 |
| 5,555,354 | 9/1996 | Strasnick et al. | 395/127 |
| 5,561,752 | 10/1996 | Jevans | 345/419 |
| 5,590,267 | 12/1996 | Butler et al. | 395/126 |
| 5,619,628 * | 4/1997 | Fujita et al. | 395/127 |
| 5,655,094 | 8/1997 | Cline et al. | 395/341 |
| 5,671,379 * | 9/1997 | Kuse et al. | 345/346 |
| 5,673,401 * | 9/1997 | Volk et al. | 395/327 |
| 5,692,173 | 11/1997 | Chow | 395/603 |
| 5,692,205 * | 11/1997 | Berry et al. | 395/788 |
| 5,706,505 | 1/1998 | Fraley et al. | 395/614 |

(List continued on next page.)

OTHER PUBLICATIONS

Platform SDK, MSDN Library, Jul. 1999.
Visual C++ Programmer's Guide, MSDN Library, Jul. 1999.
Microsoft Foundation Classes and Templates, Class Library Reference, MSDN Library, Jul. 1999.
*Win 32 Programmers Reference*, Chapter 14, Microsoft Press, 1993.
*Microsoft Windows 98 Official Preview Kit*, pp. 49–53, Microsoft Press, 1997.

* cited by examiner

Primary Examiner—Dennis M. Butler
Assistant Examiner—Rijue Mai
(74) Attorney, Agent, or Firm—Klarquist Sparkman Campbell Leigh & Whinston, LLP

(57) ABSTRACT

A global viewer scrolling system that includes maximizing visibility of one or more child generations within a component family hierarchy. Ensuring or maximizing component visibility includes establishing bi-directional communications between a parent component and a child component, and enabling a parent component to respond to an ensure visible request from a child component when an ensure visible request is received by the parent. A parent component response to an ensure visible request includes, maximizing visibility of an identified geometry by scrolling and/or clipping, translating the origin coordinates of the identified geometry with respect to the next higher parent, and propagating the ensure visible request up the component family hierarchy to the next higher parent component if one exists.

31 Claims, 7 Drawing Sheets

U.S. PATENT DOCUMENTS

| | | | |
|---|---|---|---|
| 5,717,877 * | 2/1998 | Orton et al. | 395/326 |
| 5,739,819 | 4/1998 | Bar-Nahum | 345/426 |
| 5,754,808 * | 5/1998 | Tanaka et al. | 395/339 |
| 5,796,404 | 8/1998 | Gentner | 345/352 |
| 5,828,374 | 10/1998 | Coleman et al. | 345/341 |
| 5,831,606 | 11/1998 | Nakajima et al. | 345/326 |
| 5,838,319 | 11/1998 | Guzak et al. | 345/340 |
| 5,838,330 * | 11/1998 | Ajima | 345/427 |
| 5,852,439 * | 6/2000 | Musgrove et al. | 345/339 |
| 5,854,634 * | 12/1998 | Kroitor | 345/473 |
| 5,861,885 | 1/1999 | Strasnick et al. | 345/355 |
| 5,870,098 | 2/1999 | Gardiner | 345/426 |
| 5,872,566 | 2/1999 | Bates et al. | 345/341 |
| 5,874,961 | 2/1999 | Bates et al. | 345/341 |
| 5,877,766 | 3/1999 | Bates et al. | 345/357 |
| 5,896,132 | 4/1999 | Berstis et al. | 345/341 |
| 5,903,271 | 5/1999 | Bardon et al. | 345/419 |
| 5,913,063 * | 6/1999 | McGurrin et al. | 395/702 |
| 5,923,328 | 7/1999 | Griesmer | 345/357 |
| 5,933,549 * | 8/1999 | Ide et al. | 382/309 |
| 5,943,052 | 8/1999 | Allen et al. | 345/341 |
| 5,956,736 | 9/1999 | Hanson et al. | 707/513 |
| 5,966,133 | 10/1999 | Hoppe | 345/420 |
| 5,973,663 | 10/1999 | Bates et al. | 345/123 |
| 5,977,972 | 11/1999 | Bates et al. | 345/341 |
| 5,986,661 | 11/1999 | Hemingway | 345/421 |
| 6,005,573 * | 12/1999 | Beyda et al. | 345/341 |
| 6,072,493 * | 6/2000 | Driskell et al. | 345/356 |

GLOBAL VIEWER SCROLLING SYSTEM

FIELD OF THE INVENTION

This invention relates to User Interface (UI) controls, and in particular, to an automatic global mechanism to ensure maximum visibility of the rendering of a component within an component family hierarchy. UI controls in the context of this document are the underlying mechanisms and/or processes that facilitate and/or supplement visual and operational UI features

PROBLEM

The problem addressed by the present invention is how to maximize the visibility of a component within a component family hierarchy that includes at least one embedded viewer. The following definitions are provided for clarity of terms used throughout this document. A component is a visual object on a display screen. Examples of components can include, but are not limited to, buttons, list boxes, viewers, and a window generally. A container is a component that contains one or more other components within its bounds. A container is also referred to as a parent or parent component, and a component within a container is also referred to as a child or child component. A viewer is a container that has the additional responsibility of dynamically offsetting component contents or renderings on a display screen. Scrolling is the process executed by a viewer or other capable parent component to reposition a child component so that it is substantially within the bounds of the parent component.

One reason ensuring component visibility is a problem is because individual containers presently implement their own viewer scrolling features so that there is no continuity of viewer features or controls from one container to the next. Each individual implementation requires that each container expend significant resources to independently create duplicative functions that are also not necessarily compatible from one container to the next. One additional problem is that the independent controls for individual components inhibit viewer scrolling among embedded components of a component family hierarchy. Because a parent component viewer has no control over child component's viewer controls, it is impossible for a parent component to scroll part of a child component into view as input focus changes within a child component. This latter problem also means that an embedded component that receives input focus may not appear anywhere within the view of a user viewing a display screen.

For these reasons, there exists an ongoing need for a uniform system of maximizing child component visibility within a component family hierarchy that typically includes at least one viewer. A system of this type has heretofore not been known prior to the invention disclosed below.

SOLUTION

The present invention solves the above and other problems by a single global scrolling function that ensures the maximum visibility of a given child component uniformly throughout a component family hierarchy. Maximizing component visibility is accomplished through interprocess communications between successive pairs of parent components and child components within a component family hierarchy so that a parent component can maximize the child component's view within the parent component in response to an ensure visible request.

Maximizing a child component's view includes, but is not limited to, establishing bi-directional communications between a parent component and a child component, and enabling a parent component to respond to an ensure visible request from a child component and its contents. A parent component response to an ensure visible request includes, maximizing the child component view, translating the origin coordinates of the child component as needed to maximize visibility, and propagating the ensure visible event up the component family hierarchy to the next higher parent component if one exists. Maximizing a child component view by a parent component that does not have scrolling support, means that the geometric rendering of a child component, such as a rectangle, is clipped as necessary to fit within the parent component's borders. Maximizing a child component view by a parent component that supports scrolling, means that the geometric rendering of a child component is repositioned within the parent component space prior to clipping to ensure that the geometric rendering of every child component fits within the parent component's borders.

DETAILED DESCRIPTION

Figure 1:
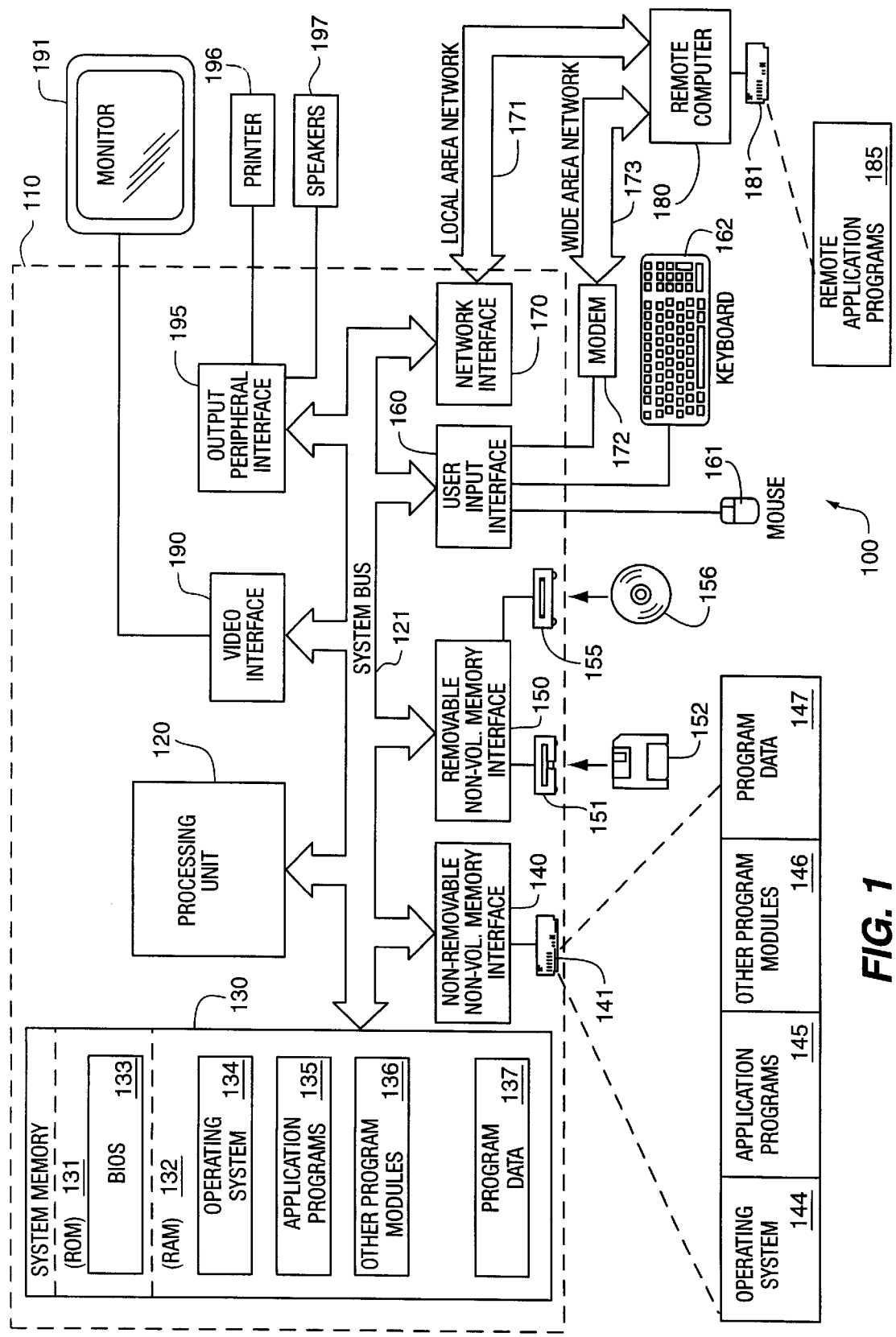
FIG. 1 illustrates an example of a computing system environment in flow diagram form on which the claimed invention could be implemented.

Computing System Environment—FIG. 1

FIG. 1 illustrates an example of a computing system environment 100 on which the claimed invention could be implemented. The computing system environment 100 is only one example of a suitable computing environment for the claimed invention and is not intended to suggest any limitation as to the scope of use or functionality of the claimed invention. Neither should the computing environment 100 be interpreted as having any dependency or requirement relating to any one or combination of components illustrated in the exemplary computing system environment 100.

The claimed invention is operational with numerous other general purpose or special purpose computing system environments or configurations. Examples of well known computing systems, environments, and/or configurations that may be suitable for use with the claimed invention can include, but are also not limited to, a general purpose Personal Computer (PC), hand-held or lap top computers, multi-processor systems, microprocessor-based systems, programmable consumer electronics, network computers, Personal Communication Systems (PCS), Personal Digital Assistants (PDA), minicomputers, mainframe computers, distributed computing environments that include any one or more of the above computing systems or devices, and the like.

The claimed invention may also be described in the general context of computer-executable instructions that are executable on a PC. Such executable instructions include the instructions within program modules that are executed on a PC for example. Generally, program modules include, but are not limited to, routines, programs, objects, components, data structures, and the like that perform discrete tasks or implement abstract data types. The claimed invention may also be practiced in distributed computing environments where tasks are performed by remote processing devices that are linked through a communications network. In a distributed computing environment, program modules may be located in both local and remote memory devices.

The exemplary computing system environment 100 is a general purpose computing device such a PC 110. Components of PC 110 include, but are not limited to, a processing unit 120, a system memory 130, and a system bus 121. The system bus 121 communicatively connects the aforementioned components and numerous other cooperatively interactive components.

Processing unit 120 is the primary intelligence and controller for PC 110 and can be any one of many commercially available processors available in the industry. System bus 121 may be any combination of several types of bus structures including, but not limited to, a memory bus, a memory controller bus, a peripheral bus, and/or a local bus. System bus 121, also referred to as an expansion bus or I/O channel, can be based on any one of a variety of bus architectures including, but not limited to, Industry Standard Architecture (ISA) bus, Micro Channel Architecture (MCA), Enhanced ISA (EISA), Video Electronics Standards Association (VESA) local bus, and Peripheral Component Interconnect (PCI) also known as Mezzanine bus.

System memory 130 is a volatile memory that can include a Read Only Memory (ROM) 131 and/or a Random Access Memory (RAM) 132. ROM 131 typically includes a Basic Input/Output System (BIOS) 133. BIOS 133 is comprised of basic routines that control the transfer of data and programs between peripheral non-volatile memories that are accessible to PC 110 during start-up or boot operations. RAM 132 typically contains data and/or programs that are immediately accessible to and/or presently being operated on by processing unit 120. Types of data and/or programs in RAM 132 can include operating system programs 134, application programs 135, other program modules 136, and program data 137.

Other components in PC 110 include numerous peripheral devices that are accessible to processing unit 120 by way of system bus 121. The peripheral devices are supported by appropriate interfaces that can include a first non-volatile memory interface 140 for non-removable non-volatile memory device support, a second non-volatile memory interface 150 for removable non-volatile memory device support, a user input interface 160 for serial device support, a network interface 170 for remote device communication device support, a video interface 190 for video input/output device support, and an output peripheral interface 195 for output device support.

Examples of a non-removable non-volatile memory device can include a magnetic disk device 141 or other large capacity read/write medium such as an optical disk, magnetic tape, optical tape, or solid state memory. Types of data often stored on a non-removable non-volatile memory device include persistent copies of programs and/or data being used and/or manipulated in RAM 132 such as operating system programs 144, application programs 145, other program modules 146, and program data 147.

One example of a removable non-volatile memory device can include a magnetic floppy disk device or hard disk device 151 that accepts removable magnetic media 152.

Another example of a removable non-volatile memory device can include an optical disk device 155 that accepts removable optical media 156. Other types of removable media can include, but are not limited to, magnetic tape cassettes, flash memory cards, digital video disks, digital video tape, Bernoulli cartridge, solid state RAM, solid state ROM, and the like.

User input interface 160 supports user input devices that can include, but are not limited to, a pointing device 161 commonly referred to as a mouse or touch pad, and a keyboard 162. Other user input devices can include, but are not limited to, a microphone, joystick, game pad, neurostimulated sensor, and scanner, and may require other interface and bus structures such as a parallel port, game port or a Universal Serial Bus (USB) for example.

User input/output devices supported by video interface 190 can include a display monitor 191 or a video camera. Output peripheral interface 195 supports output devices such as printer 196 and speakers 197.

Network interface 170 supports communications access to a remote computing facility such as remote computer 180 by way of Local Area Network (LAN) 171 and/or Wide Area Network (WAN) 173, or other Intranet or Internet connection. Other remote computing facility types for remote computer 180 can include, but are not limited to, a PC, server, router, printer, network PC, a peer device, or other common network node. A remote computer 180 can typically include many or all of the components described above for PC 110. Modulator/Demodulator (MODEM) 172 can also be used to facilitate communications to remote computer 180. Types of programs and/or data accessible from remote memory device 181 on remote computer 180 can include, but are not limited to, remote application programs 185.

Figure 2:
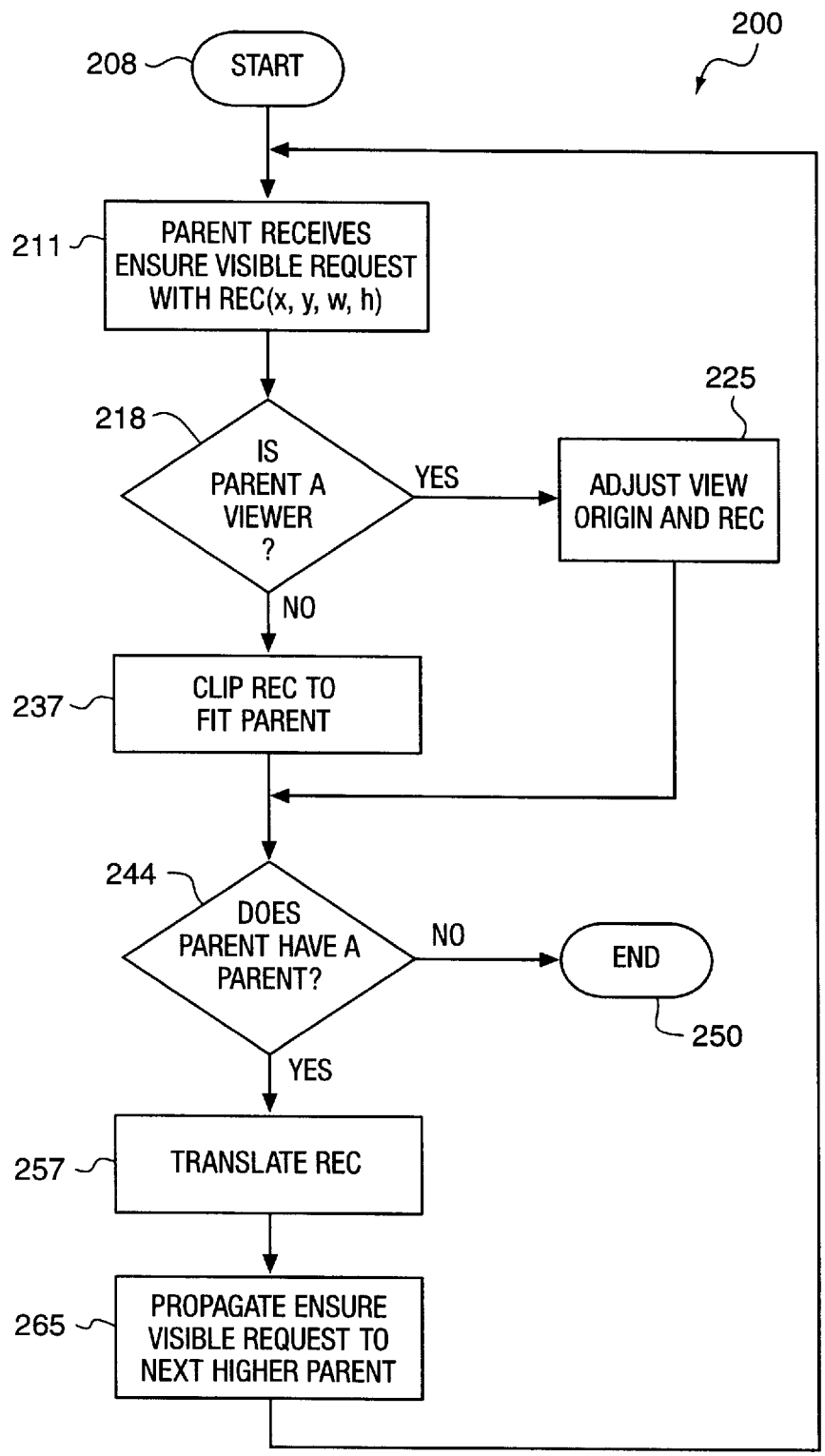
FIG. 2 illustrates a global viewer scrolling system operational overview in low diagram form.

Global Viewer Scrolling System Operational Overview—FIG. 2

FIG. 2 illustrates the global viewer scrolling system operational overview 200 in flow diagram form. The overview 200 begins at step 208 and proceeds to step 211 where a parent component receives an ensure visible request from a child component for a geometric rendering. Receiving an ensure visible request includes the important step of establishing two-way interprocess communications between a receiving parent component and a requesting child component to facilitate the ensure visible method call and the ability of the parent component to manage the child component space to ensure maximum child content visibility. Key information accompanying an ensure visible request includes, but is not limited to, the (x,y) origin coordinates of the top left corner of a rectangle (REC) that is the object of the request, in addition to the width (RECw) and height (RECh) dimensions of the rectangle respectively. The linear units in which the origin and the width and height dimensions are identified can be of any type provided that the units are consistently used throughout the component family hierarchy.

Note that although the present discussion refers to the geometric rendering of component content in terms of a rectangle, the fundamental idea of the present invention is in no way limited to rectangles or any other geometry.

Any geometric shape is considered within the scope of the present invention with the understanding that certain processing adjustments are necessary to accommodate any one specific geometry at issue.

Steps 218, 225, and 237 are central to maximizing the visibility of the rectangle REC. If it is determined at decision step 218 that the parent component that received the ensure visible request is a viewer, then processing continues at step 225. At step 225 the viewer's origin coordinates (Vx,Vy) and the rectangle's origin (RECx,RECy) are offset appropriately based on the location of the REC relative to the viewer. Processing then continues at step 237. Details of the scrolling process of step 225 are disclosed in further detail in the text accompanying FIG. 6. Alternatively, if it is determined at decision step 218 that the parent component that received the ensure visible request is not a viewer or otherwise does not have scrolling capability, then processing proceeds directly to step 237. At step 237, the rectangle REC is clipped to fit within the bounding width and height of a parent component's space S(w,h). Processing then continues at step 244. Details of the clipping process of step 237 are disclosed in further detail in the text accompanying FIG. 3.

If it is determined at decision step 244 that the present parent component does not itself have a parent in the component family hierarchy, then no further iterations of the global viewer scrolling process are required for the present REC and the global viewer scrolling process ends at step 250. The operational overview 200 can begin again at any time from step 211 the next time an ensure visible request is made. Reasons for any component making an ensure visible request can include, but are not limited to, a component receiving input focus, or a component that does not have input focus but nevertheless has a visibility requirement or adjustment need for any reason. Alternatively, if it is determined at decision step 244 that the present parent component does have a parent component in the component family hierarchy, then processing continues at step 257.

At step 257, the (x,y) origin coordinates of the top left corner of the REC are translated by the parent component so that the coordinates can be passed to a next higher parent to further ensure maximum visibility of the REC. That is, for each ensure visible request, the REC's origin coordinates are translated according to how far away the REC's top left corner origin is located from the next most immediate parent's top left corner origin. Propagating an ensure visible request to subsequent parent components in a component family hierarchy passes the translation of the REC's origin relative to a given parent component. Absent a translation of the REC's coordinates, a parent component has no way to determine if the REC's dimensions are inside or outside that parent's own borders.

At step 265, the present parent component propagates the ensure visible request to the next higher parent in the component family hierarchy so the most senior parent component has maximized the visibility of all its children including the original REC. Processing then proceeds at step 211 as previously disclosed when the next higher parent receives the propagated ensure visible request.

The following pseudo-code illustration is an example of the present invention as it might appear in programming language code. The pseudo-code below presumes that a child component is created pursuant to normal UI input handling.

Function Got_Input
.
. /*normal input handling code */
.
Create Rectangular Component "r" with origin and dimensions of
left=0
top=0
right=height "h"
bottom=width "w"
call Ensure_Visible, passing "r"

By default, all parent components support basic child coordinate translation and an ensure visible event function call such as the following:

Function Ensure_Visible(Rectangle r)
    If child has a parent then
        Get coordinates of child's top left corner within the parent
        Add coordinates' left value to r's left value
        Add coordinates' top value to r's top value
        Call parent's Ensure-Visible function passing it "r"

However, if the parent is a viewer or otherwise has scrolling capability then the Ensure_Visible function can be implemented in the following manner so that the child component REC is relocated within the parent component space as necessary prior to any child component border adjustments:

Function Ensure_Visible(Rectangle r)
    If "r" is not within parent's boundaries
        Compute child relocation distance "d"
        Adjust all children of this parent including "r" by distance "d"
    If this child has a parent then
        Get coordinates of child's top left corner within the parent
        Add coordinates' left value to r's left value
        Add coordinates' top value to r's top value
        Call parent's Ensure-Visible function passing it "r"

Figure 3:
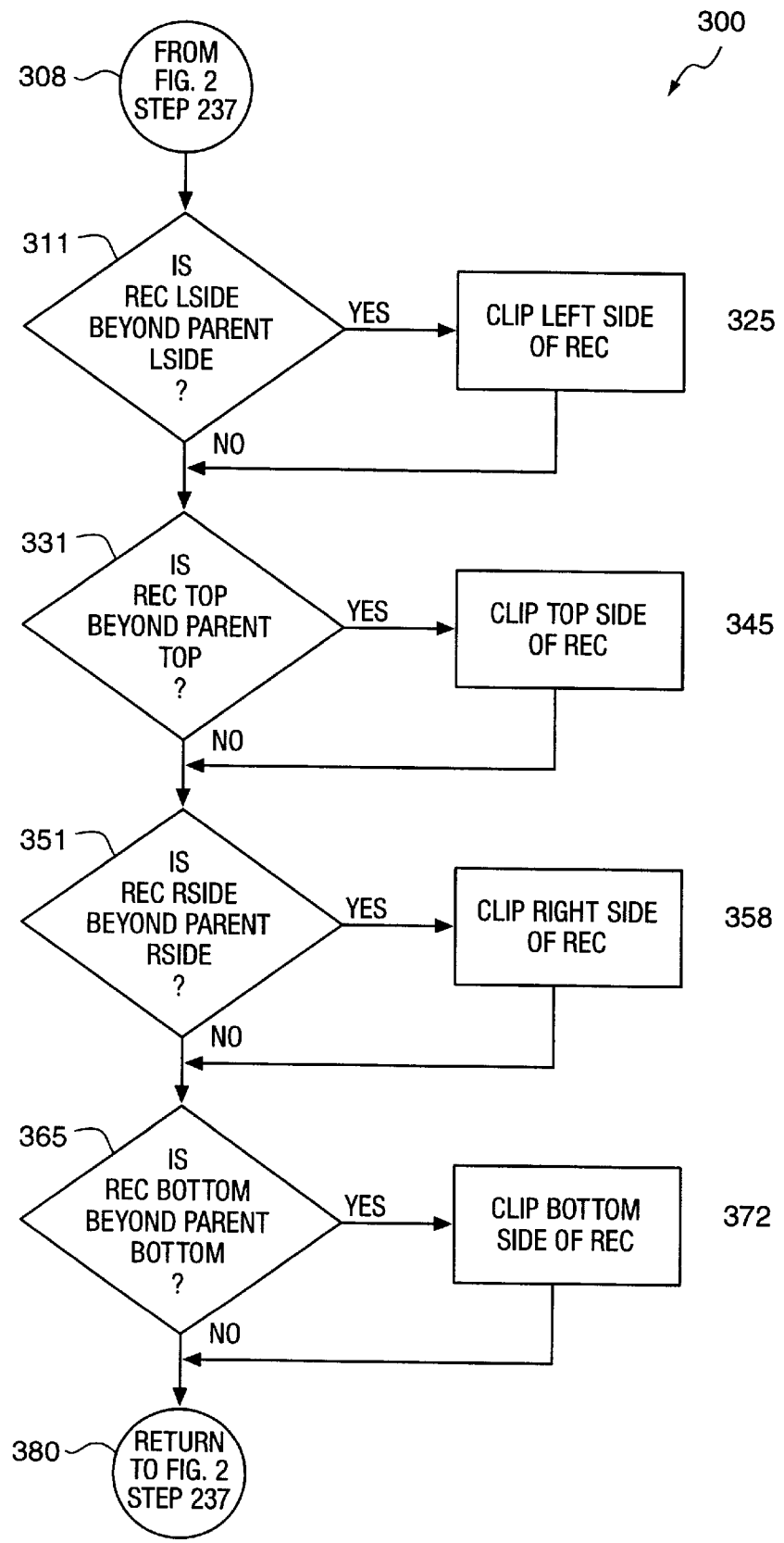
FIG. 3 illustrates the clipping process operational steps in flow diagram form.
Figure 4:
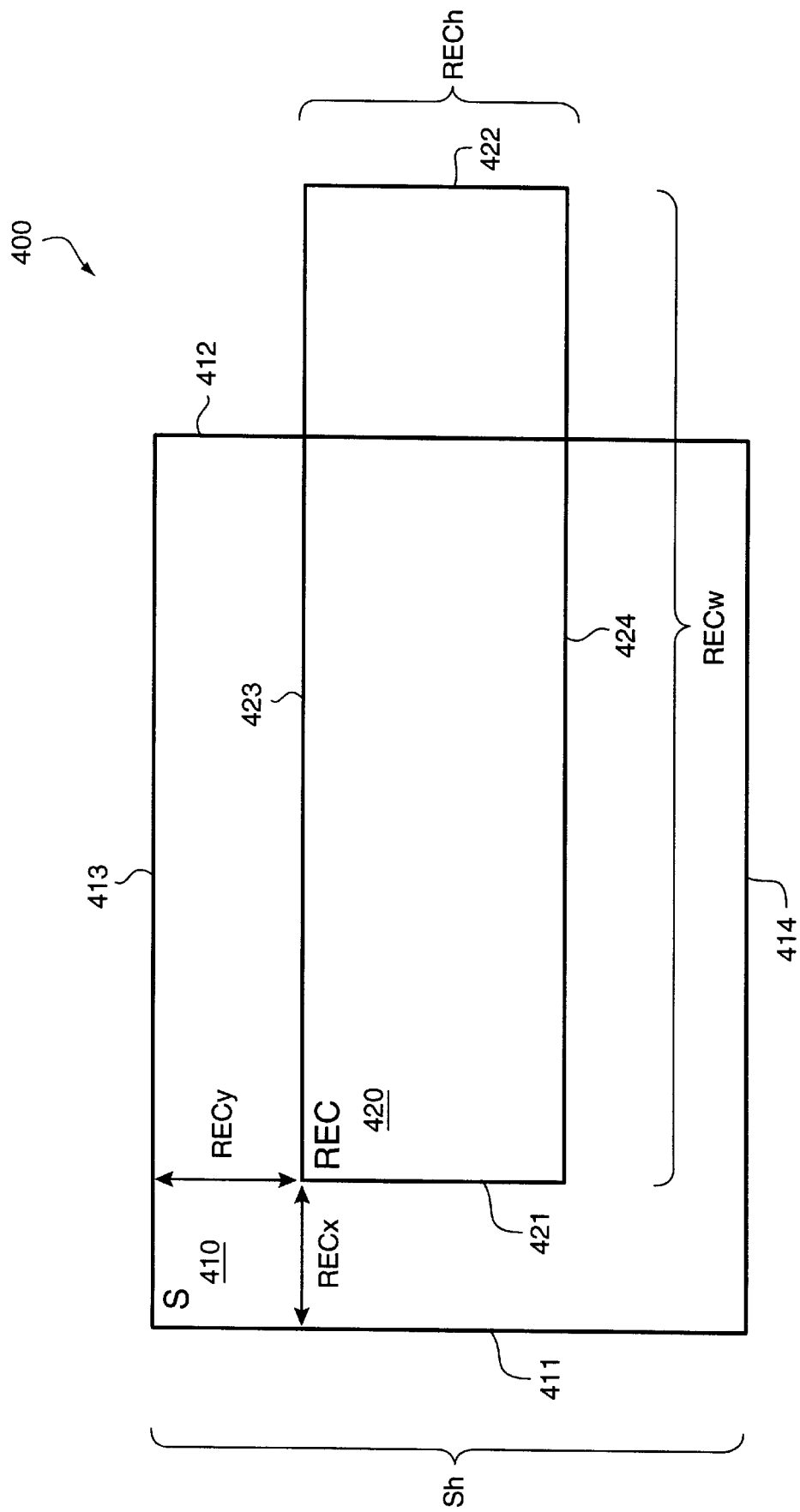
FIG. 4 illustrates a first clipping process example in block diagram form.
Figure 5:
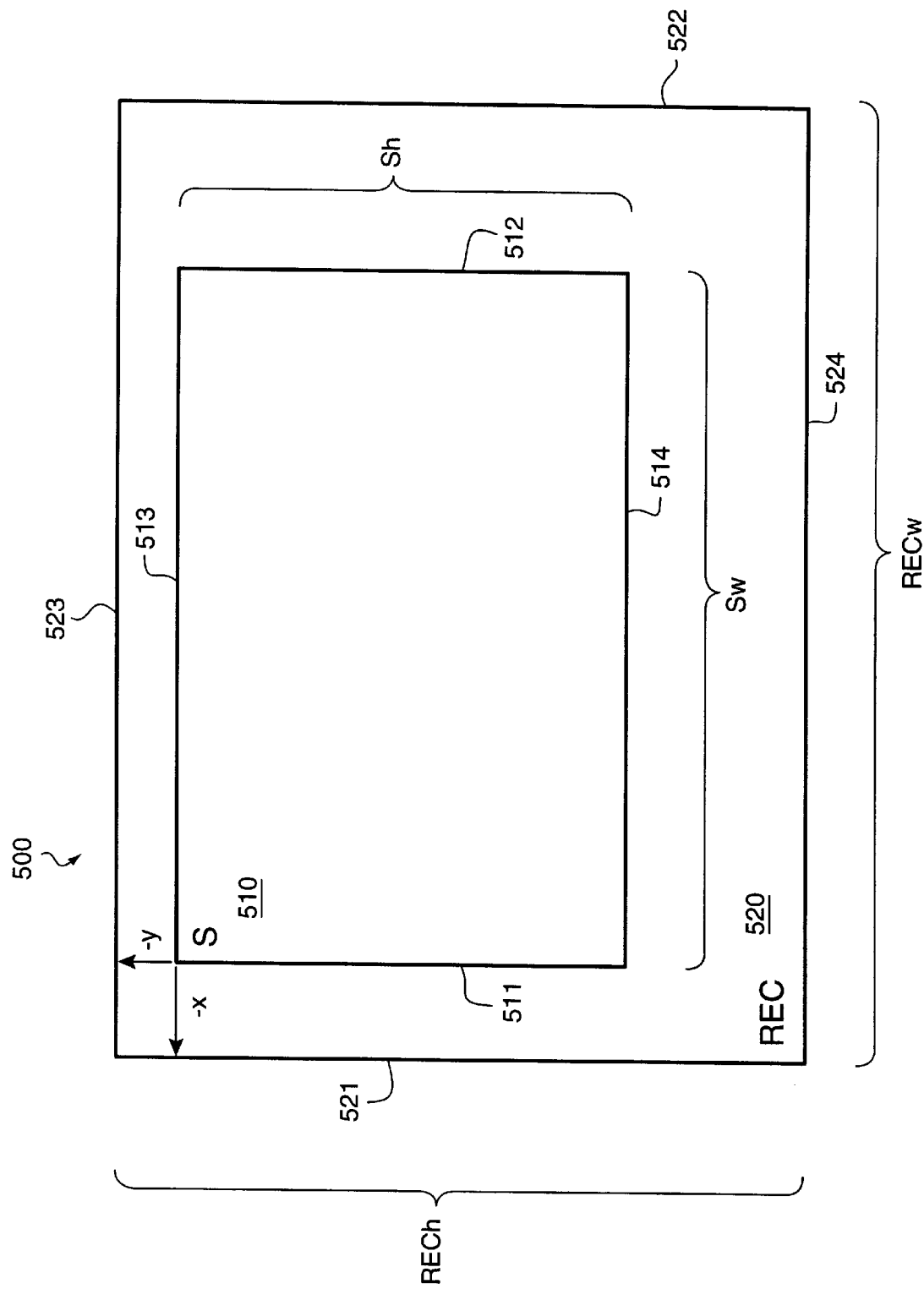
FIG. 5 illustrates a second clipping process example in block diagram form.

Clipping Process Operational Steps And Examples—FIGS. 3–5

FIG. 3 illustrates the clipping process operational steps 300 in flow diagram form. The clipping process operational steps 300 begin at step 308 and are the details of step 237 from FIG. 2. The purpose of the clipping process operational steps 300 is to contain the REC identified in the ensure visible request within each successive parent component space up through the component family hierarchy. The following discussion assumes that the REC's (x,y) origin and (width, height) dimensions are REC(x,y,w,h) respectively, and that the parent component's space or its (width, height) dimensions are S(w,h) respectively. Given this origin and dimension information, the REC's left side is REC(x), the REC's right side is REC(x)+REC(w), the REC's top side is REC(y), and the REC's bottom side is REC(y)+REC(h).

If it is determined at decision step 311 that the REC's left side is within the parent component space, then the REC's left side REC(x) is within the parent component's space S and processing continues directly to step 331. Alternatively, if it is determined at decision step 311 that the REC's left side is not within the parent component space, then processing continues at step 325. One way to determine if the REC's left side is within the parent component's space is if REC (x)<0, given that the parent sees its own origin (x,y) as being located at (0,0). At step 325, the REC's left side is clipped so that it is within the bounds of the parent component space and processing continues at step 331. One way to clip the REC's left side is to adjust REC(w) by REC(w)+REC(x), and then setting REC(x)=0 so that the REC's left side is the same as the left side of the parent component.

If it is determined at decision step 331 that the REC's top side REC(y) is within the parent component's space S, then processing continues directly to step 351. Alternatively, if it is determined at decision step 331 that the REC's top side REC(y) is not within the parent component's space S, the processing continues at step 345. One way to determine if the REC's top side is within the parent component's space is if REC(y)<0 given that the parent sees its own origin (x,y) as being located at (0,0). At step 345, the REC's top side is clipped so that it is within the bounds of the parent component space and processing continues at step 351. One way to clip the REC's top side is to adjust REC(y)=REC(h)+REC(y), and then setting REC(y)=0 so that the REC's top side is the same as the top side of the parent component.

If it is determined at decision step 351 that the REC's right side REC(x)+REC(w) is within the parent component's space S, then processing continues directly to step 365. Alternatively, if it is determined at decision step 351 that the REC's right side REC(x)+REC(w) is not within the parent component's space S, the processing continues at step 358. One way to determine if the REC's right side is within the parent component's space is if the REC's right side REC(x)+REC(w)>S(w). At step 358, the REC's right side is clipped so that it is within the bounds of the parent component space and processing continues at step 365. One way to clip the REC's right side is to adjust REC(w)=S(w)−REC(x) so that the REC's right side is the same as the right side of the parent component.

If it is determined at decision step 365 that the REC's bottom side REC(y)+REC(h) is within the parent component's space S, then processing continues directly to step 380 by returning to step 237 in FIG. 2. Alternatively, if it is determined at decision step 365 that the REC's bottom side REC(y)+REC(h) is not within the parent component's space S, the processing continues at step 372. One way to determine if the REC's bottom side is within the parent component's space is if REC(y)+REC(h)>S(h). At step 372, the REC's bottom side is clipped so that it is within the bounds of the parent component space and processing continues at step 380. One way to clip the REC's bottom side is to adjust REC(h)=S(h)−REC(y). Clipping processing is complete at step 380 by returning to step 237 of FIG. 2.

FIG. 4 illustrates a first clipping process example 400 in block diagram form. The first clipping process example 400 includes a parent component 410 and a child component 420. Parent component 410 includes left and right sides 411 and 412 respectively, and a top side and bottom side 413 and 414 respectively. Parent component 410 will be referred to as having a size S that is a width S(w) and height S(h) or S(w,h). Child component 420 includes left and right sides 421 and 422 respectively, and a top side and bottom side 423 and 424 respectively. Child component 420 is displayed as a rectangle REC having a width REC(w) and height REC(h), and having origin coordinates of (x,y) with respect to parent component 410, so that the REC dimensions are REC(x,y,w,h). For purposes of the present example assume the dimensions and origin of S(100,80) and REC(25,20,105,40).

Applying the previously disclosed clipping process operational steps 300 demonstrates that the left side 421, top side 423, and bottom side 424 of REC 420 are all within the S(w) and S(h) bounds of parent component 410. However, the right side 422 of REC 420 is beyond the right side 412 of the parent component. The right side 422 can be clipped so that it is equal to the parent component's right side 412 by adjusting R(w)=S(w)−REC(x). After clipping the REC 420 origin and dimensions are REC(25,20,75,40).

FIG. 5 illustrates a second clipping process example 500 in block diagram form. The second clipping process example 500 includes a parent component 510 and a child component 520. Parent component 510 includes left and right sides 511 and 512 respectively, and a top side and bottom side 513 and 514 respectively. Parent component 510 will be referred to as having a size S that is a width S(w) and height S(h) or S(w,h). Child component 520 includes left and right sides 521 and 522 respectively, and a top side and bottom side 523 and 524 respectively. Child component 520 is displayed as a rectangle REC having a width REC(w) and height REC(h), and having origin coordinates of (x,y) with respect to parent component 510, so that the REC dimensions are REC(x,y,w,h). For purposes of the present example assume the dimensions and origin of S(100,80) and REC(−20,−5,160,105).

Applying the previously disclosed clipping process operational steps 300 demonstrates that all four sides of REC 520 are beyond the S(w) and S(h) bounds of parent component 510. However, after clipping the REC 520 origin and dimensions are REC(0,0,100,80).

Figure 6:
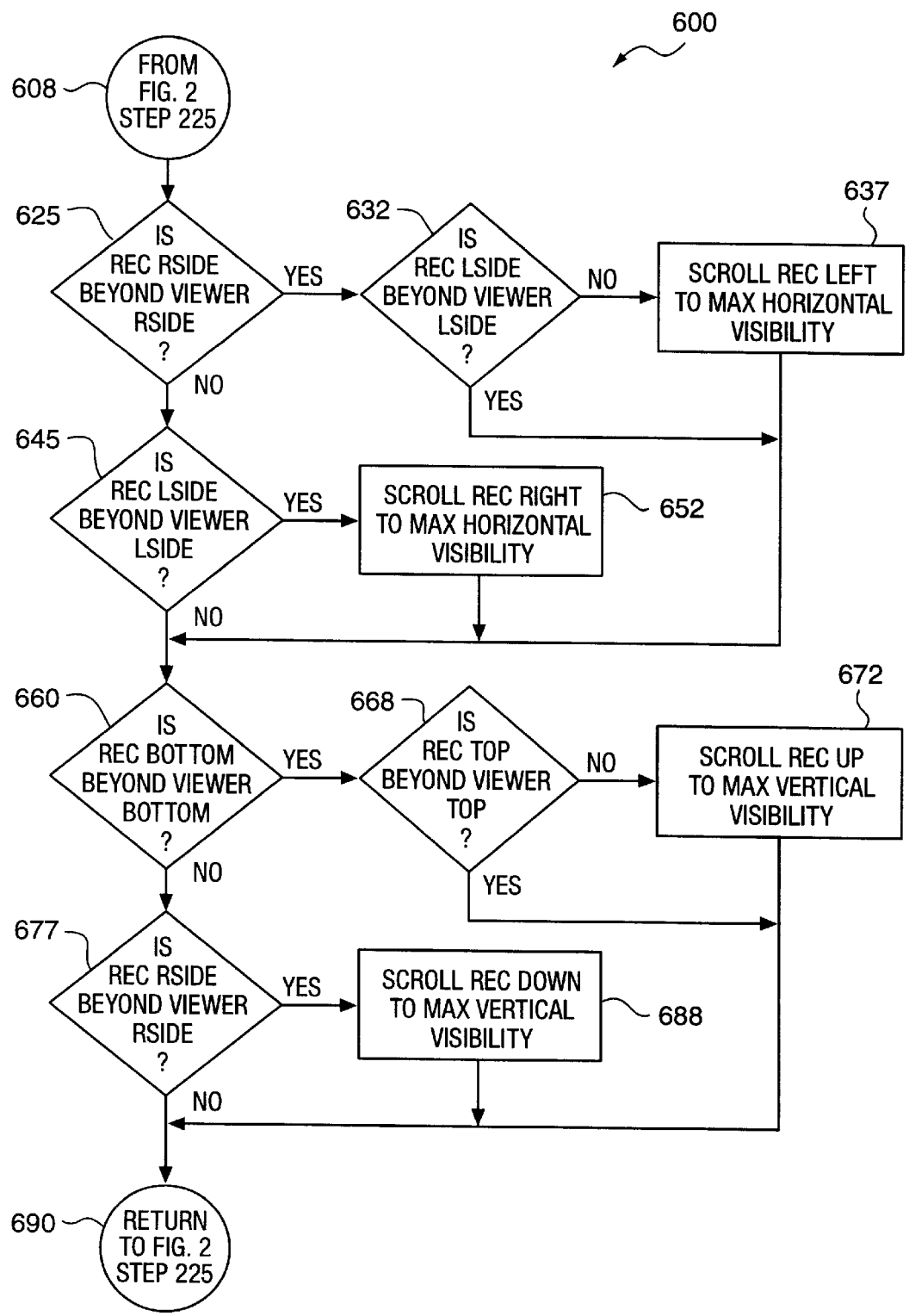
FIG. 6 illustrates the scrolling process operational steps in flow diagram form.
Figure 7:
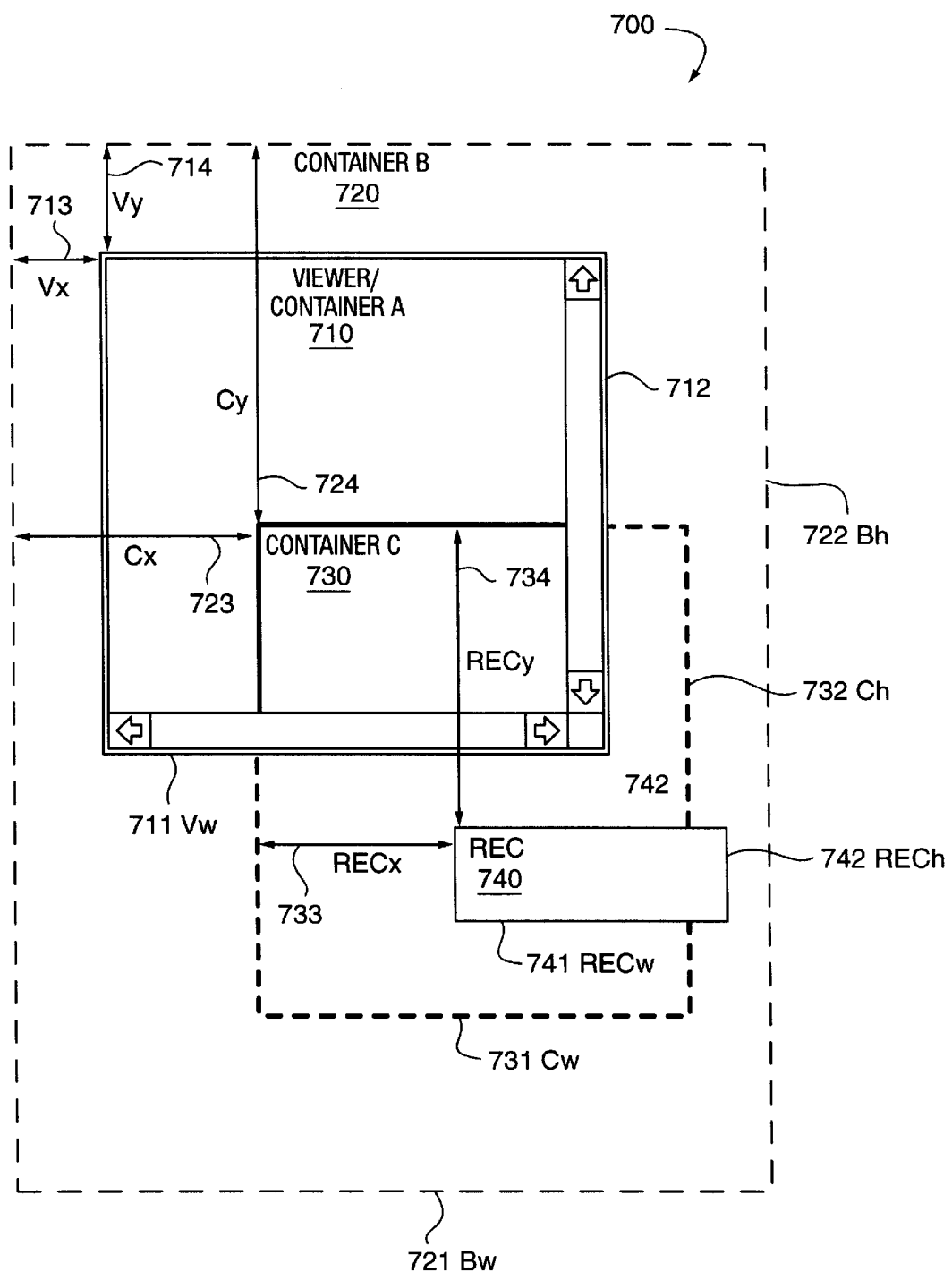
FIG. 7 illustrates a scrolling process example in block diagram form.

Scrolling Process Operational Steps And Examples—FIGS. 6–7

FIG. 6 illustrates the scrolling process operational steps 600 in flow diagram form. The operational steps 600 begin at step 608 and represent the details of step 225 from FIG. 2. The operational steps 600 are divided into two main phases that include determining the need for scrolling rectangle REC in the horizontal direction in steps 625–652, and the need for scrolling rectangle REC in the vertical direction in steps 660–688. The purpose of the operational steps 600 is to scroll the rectangle REC into a position and adjust the viewer V offset accordingly so that a maximum amount of the REC is within the bounds of viewer V. Once the maximum amount of REC is within the bounds of viewer V, then any portion of REC that remains outside the bounds of viewer V is clipped in a manner as previously disclosed in the text accompanying FIG. 3. Although examples of ways to determine the amount and direction of scrolling are disclosed below, any method of determining the amount and direction needed to maximize the visibility of REC within the bounds of V are considered within the scope of the present invention.

If it is determined at decision step 625 that the right side of the child component's rectangle REC is beyond the right side of viewer V, then processing continues at step 632. One way to determine if the REC's right side is beyond V's right side is if REC(x)+REC(w)>S(w). Alternatively, if it is determined at decision step 625 that the REC's right side is not beyond V's right side, then processing continues directly to step 645.

If it is determined at decision step 632 that the REC's left side is beyond V's left side, then the REC is already maximally visible along a horizontal axis and processing can proceed directly to step 660 to determine the need for scrolling in the vertical direction. One way to determine if the REC's left side is beyond V's left side is if REC(x)<0. Alternatively, if it is determined at decision step 632 that the REC's left side is not beyond V's left side, then the REC can be scrolled left at step 637 to maximize the horizontal visibility of the REC within viewer V. Processing can then continue at step 660 to determine the need for scrolling in the vertical direction. One way to scroll REC and any other child component within the component family hierachy to the left, is to determine the amount of the REC that is beyond the right side of viewer V and scrolling REC that determined distance left. For example, the distance to move horizontally can be determined as D=V(w)−(REC(x)+REC(w)). Then the viewer's horizontal origin V(x) can be offset as V(x)=V(x)+

D. Finally, the REC is scrolled along with all other child component left by distance D as determined by REC(x)=REC(x)+D.

The following scenario follows from step 625 where it was determined that the REC's right side was not beyond V's right side. If it is determined at decision step 645 that the REC's left side is beyond V's left side, then the REC can be scrolled right at step 652 to maximize the horizontal visibility of the REC within viewer V. Processing can then continue at step 660 to determine the need for scrolling in the vertical direction. One way to scroll REC and all other child components within the component family hierachy to the right, is to offset the viewer's horizontal origin V(x) by V(x)=V(x)+REC(x), and set the EC's horizontal origin REC(x)=0. Alternatively, if it is determined at decision step 645 that the REC's left side is not beyond V's left side, then the entire width of REC(w) is already within viewer V and processing can continue at step 660 to determine the need for scrolling in the vertical direction.

If it is determined at decision step 660 that the bottom side of the child component's rectangle REC is beyond the bottom side of viewer V, then processing continues at step 668. One way to determine if the REC's bottom side is beyond V's bottom side is if REC(y)+REC(h)>S(h). Alternatively, if it is determined at decision step 660 that the REC's bottom side is not beyond V's bottom side, then processing continues directly to step 677.

If it is determined at decision step 668 that the REC's top side is beyond V's top side, then the REC is already maximally visible along a vertical axis and processing is complete at step 690. One way to determine if the REC's top side is beyond V's top side is if REC(y)<0. Alternatively, if it is determined at decision step 668 that the REC's top side is not beyond V's top side, then the REC can be scrolled up at step 672 to maximize the vertical visibility of the REC within viewer V. Processing is then complete at step 690. One way to scroll REC and all other child components up is to determine the amount of the REC that is beyond the bottom side of viewer V and then scroll the REC and all other child components up that determined distance. For example, the distance to move vertically can be determined as D=V(h)–(REC(y)+REC(h)). Then the viewer's vertical origin V(y) can be offset as V(y)=V(y)+D. Finally, the REC and all other child components is scrolled up by distance D as determined by REC(y)=REC(y)+D.

The following scenario follows from step 660 where it was determined that the REC's bottom side was not beyond V's bottom side. If it is determined at decision step 677 that the REC's top side is beyond V's top side, then the REC can be scrolled down at step 688 to maximize the vertical visibility of the REC within viewer V. Processing is then complete at step 690. One way to scroll REC down is to offset the viewer's vertical origin V(y) by V(y)=V(y)+REC(y), and set the REC's vertical origin REC(y)=0. Alternatively, if it is determined at decision step 677 that the REC's top side is not beyond V's top side, then the entire height of REC(h) is already within viewer V and processing is complete at step 690. At step 690, processing returns to step 225 of FIG. 2.

FIGS. 4–5 and 7 are useful to illustrate a complete scrolling system scenario. FIGS. 4–5 illustrate simple one-level parent and child examples, and FIG. 7 illustrates a more complex multi-level component example.

In FIG. 4, assume that the parent component 410 is a viewer V having V(100,80), and child component 420 is a rectangle REC having an origin and dimensions of REC(25,20,105,40). Because parent component 410 is a viewer V, then the rectangle REC is examined to determine if scrolling is necessary. REC's right side is beyond the viewer V's right side but the REC's left side is not beyond V's left side. For this reason, the REC 410 can be scrolled left to maximize horizontal visibility within viewer V. The horizontal scroll distance can be determined as D=V(w)–(REC(x)+REC(w))=100–(25+105)=–30. Then the viewer's horizontal origin V(x) can be offset as V(x)=V(x)+D=0–30 =–30. Finally, the REC and all other child components is scrolled left by distance D as determined by REC(x)=REC(x)+D=25–+=–5. Because the REC's top and bottom sides are already within the bounds of V, the scrolling process is complete. The clipping process will adjust REC(x)=0 to clip the portion of the REC's left side that is beyond V's left side. Because there are no other parents of viewer V 410, the ensure visible request will not be propagated and the final origin and dimension specifications are REC(0,20,100,40).

In FIG. 5, assume that the dimensions of parent component 510 are V(100,80), and the child component 520 is a rectangle REC having an origin and dimensions of REC(–20,–5,160,105). Because parent component 510 is a viewer V, then the rectangle REC is examined to determine if scrolling is necessary. Because the REC's right, left, top, and bottom sides are beyond the corresponding sides of V, the REC is already maximally visible so that no scrolling is necessary. The clipping process will adjust the origin and dimensions of REC as previously disclosed in the text accompanying FIG. 5. Because there are no other parents of the viewer V, the ensure visible request will not be propagated and the final origin and dimension specifications will be REC(0,0,100,80).

FIG. 7 illustrates a more complex global viewer scrolling system scenario 700 for a component family hierarchy 710, 720, 730, and 740 in block diagram form. REC 740 is the rectangle whose visibility is being maximized by way of an ensure visible request to container C 730 with dimensions and a translated origin of REC(RECx, RECy, RECw, RECh).

Container C 730 is the next higher parent component to receive the ensure visible request for REC 740. Container C 730 is not a viewer and has dimensions Cw as width 731 and Ch as height 732. Because Container C is not a viewer no scrolling process will take place. However, REC 740 has a right side 742 that is beyond the right side 732 of Container C 730, so REC's right side 742 is clipped to REC(RECx, RECy, (Cw–RECx), RECh) so that it is within Container C 730. Component C 730 now translates the origin of REC 740 to REC((RECx+Cx), (RECy+Cy), (Cw–RECx), RECh) with respect to the next higher parent component, and the ensure visible request is propagated to the next higher parent Component B 720.

Container B 720 is the next higher parent component to receive the ensure visible request for REC 740. Container B 720 is not a viewer and has dimensions Bw as width 721 and Bh as height 722. Because Container B is not a viewer no scrolling process will take place. In addition, REC 740 is already completely within the bounds of Component B 720 so no clipping is required. Component B 720 now translates the origin of REC 740 to REC((RECx+Cx+Vx), (RECy+Cy+Vy), (Cw–RECx), RECh) with respect to the origin of the next higher parent, and an ensure visible request is propagated to the next higher parent Component A 710.

Container A 710 is the next higher parent component to receive the ensure visible request for REC 740. Container A 710 is a viewer V with dimensions Vw as width 711 and Vh as height 712. Because V is a viewer a scrolling analysis determines that the REC's right side 742 is beyond V's right side 712 but that the REC's left side 733 is not beyond V's left side 713. For this reason, REC and all other child components 740 will be scrolled left by determining a distance D to adjust horizontally, adjusting V's horizontal origin Vx, and adjusting REC's horizontal origin RECx accordingly. Specifically, the distance D=Vw−(RECx+ RECw), V's horizontal origin adjustment Vx=Vx+D, and REC's horizontal adjustment RECx=RECx+D. In addition, REC's bottom side 741 is beyond V's bottom side 711 but that the REC's top side 743 is not beyond V's top side 714. For this reason, REC 740 will be scrolled up by determining a distance D to adjust vertically, adjusting V's vertical origin Vx, and adjusting REC's vertical origin RECx accordingly. Specifically, the distance D=Vh−(RECy+RECh), V's vertical origin adjustment Vy=Vy+D, and REC's vertical adjustment RECy=RECy+D. Viewer 710 has no parent so that the ensure visible request is not propagated any further. Note that the reason for adjusting the viewer V origin in addition to the REC horizontal and vertical adjustment is because not all children of V 710 can be moved or need to be moved so that the viewer origin can be adjusted and/or the REC must adjust accordingly since all child components will move when the viewer origin changes.

SUMMARY

The present invention is a global viewer scrolling process that maximizes visibility of one or more child generations within a parent component in the context of a component family hierarchy. Ensuring or maximizing component visibility is accomplished by establishing bi-directional communications between a parent component and a child component, and enabling a parent component to respond to an ensure visible request from a child component when an ensure visible request is received by the parent. A parent component response to an ensure visible request includes, maximizing visibility of an identified geometry by scrolling and/or clipping, translating the origin coordinates of the identified geometry with respect to the next higher parent, and propagating the ensure visible request up the component family hierarchy to the next higher parent component if one exists.

Although specific embodiments of the present invention are disclosed herein, it is expected that persons skilled in the art can and will make, use, and/or sell alternative global viewer scrolling systems in a manner that is within the scope of the following claims either literally or under the Doctrine of Equivalents.

What is claimed is:

1. A machine readable memory tangibly embodying instructions executable by a computer to perform a method for maximizing a view of a geometric rendering of a child component within a parent component among a plurality of components in a component family hierarchy, said method comprising:

establishing bidirectional process communications between said child component and said parent component;

generating an ensure visible request from said child component to said parent component;

maximizing said view of all children of said parent component as directed by said parent component that received said ensure visible request by way of parent component offset adjustments relative to an adjustment of any of said child component for each said parent component having scroll capability; and propagating said ensure visible request to other of said plurality of components throughout said component family hierarchy to a most senior parent component of said component family hierarchy, wherein subsequent iterations of ensure visible event processing treat successive parent components as successive child components up to said most senior parent component.

2. A method according to claim 1 including:

translating coordinates of said geometric rendering to reflect coordinates recognized by said parent component prior to said step of propagating said ensure visible request.

3. A method according to claim 2 wherein said step of translating includes:

first step of identifying said coordinates of said geometric rendering;

second step of identifying said parent origin coordinates; and adding a difference between said coordinates of said geometric rendering and said parent origin coordinates to said coordinates of said geometric rendering.

4. A method according to claim 1 including:

establishing a basic ensure visible function in each component of said plurality of components in said component family hierarchy.

5. A method according to claim 4 including:

second step of establishing a scrolling version of said basic ensure visible function in each component of said plurality of components having scroll capability.

6. A method according to claim 1 wherein said step of generating includes:

determining origin coordinates of said geometric rendering;

identifying a dimension definition of said child component characteristic of said geometric rendering; and calling an ensure visible function call of said parent component to pass said origin coordinates of said geometric rendering and said dimension definition of said geometric rendering to an immediate one of said parent component.

7. A method according to claim 1 wherein said step of maximizing includes:

determining if said dimension definition of said child component is of a size that fits within geometric boundaries of said parent component; and clipping said dimension definition of said child component to fit within said geometric boundaries of said parent component in negative response to said step of determining.

8. A method according to claim 1 wherein said step of maximizing includes:

first step of determining if a maximum portion of said child component is within geometric boundaries of said parent component;

scrolling said child component and said view of all children of said parent component within said geometric boundaries of said parent component in negative response to said first step of determining;

second step of determining if said dimension definition of said child component is of a size that fits within said geometric boundaries of said parent component; and adjusting said dimension definition of said child component and all other children of said parent component to fit within said geometric boundaries of said parent component in negative response to said second step of determining.

9. A machine readable memory tangibly embodying instructions executable by a computer to perform a method for maximizing a view of a geometric rendering of a child component of a parent component among a plurality of components in a component family hierarchy, said method comprising:

first step of establishing a basic ensure visible function in each component of said plurality of components in said component family hierarchy that do not support scroll capabilities among said component family hierarchy;

second step of establishing a scrolling version of said basic ensure visible function in each component of said plurality of components that supports scroll capabilities among said component family hierarchy;

third step of establishing bi-directional communications between said child component and said parent component; and recursively generating an ensure visible request from one child component to an immediate parent component up through said component family hierarchy to a most senior parent component to maximize said view of said one of said plurality of components along with each other of said plurality of components in said component family hierarchy up through said most senior parent component.

10. A method according to claim 9 wherein said step of recursively generating said ensure visible request includes:

translating origin coordinates of said geometric rendering of said child component to reflect parent coordinates recognized by said parent component; and maximizing said view of all children of said parent component as directed by said parent component.

11. A method according to claim 10 wherein said step of translating includes:

first step of identifying said origin coordinates of said geometric rendering of said child component;

second step of identifying said parent origin coordinates; and combining said origin coordinates with said parent origin coordinates.

12. A method according to claim 10 wherein said step of maximizing includes:

determining if said dimension definition of said child component is of a size that fits within geometric boundaries of said parent component that does not have scroll capability; and adjusting said dimension definition of said child component to fit within said geometric boundaries of said parent component in negative response to said step of determining.

13. A method according to claim 10 wherein said step of maximizing includes:

first step of determining if a maximum portion of said child component is within geometric boundaries of said parent component that has scroll capability;

scrolling said child component and said view of all children of said parent component within said geometric boundaries of said parent component in negative response to said first step of determining;

second step of determining if said dimension definition of said child component is of a size that fits within said geometric boundaries of said parent component; and adjusting said dimension definition of said child component and all other children of said parent component to fit within said geometric boundaries of said parent component in negative response to said second step of determining.

14. A method according to claim 9 wherein said step of generating includes:

determining origin coordinates of said child component;

identifying a dimension definition of said child component characteristic of a geometric shape of said child component; and calling an ensure visible function call of said parent component to pass said origin coordinates of said child component and said dimension definition of said child component to said parent component.

15. A machine readable memory tangibly embodying instructions executable by a computer to recursively perform a method for maximizing a view of a child component within a parent component among a plurality of components in a component family hierarchy, said method comprising:

establishing an ensure visible event function in each component of said plurality of components in said component family hierarchy; and generating an ensure visible request from one child component to an immediate parent component up through said component family hierarchy to a most senior parent component to perform steps that include:

translating child coordinates of said child component to reflect parent coordinates recognized by said parent component determining if said dimension definition of said child component is of a size that fits within geometric boundaries of said parent component; and adjusting said dimension definition of said child component to fit within said geometric boundaries of said parent component in negative response to said step of determining.

16. A method according to claim 15 wherein said step of translating includes:

first step of identifying said child origin coordinates of said child component;

second step of identifying said parent origin coordinates; and adding a difference between said child origin coordinates and said parent origin coordinates to said child origin coordinates.

17. A method according to claim 15 wherein said step of adjusting includes:

determining if a maximum portion of said child component is within geometric boundaries of said parent component that has scroll capability; and scrolling said child component and all children of said parent component within said geometric boundaries of said parent component in negative response to said step of determining.

18. A method according to claim 15 wherein said step of generating includes:

determining origin coordinates of said child component;

identifying a dimension definition of said child component characteristic of a geometric shape of said child component; and calling an ensure visible function call of said parent component to pass said origin coordinates of said child component and said dimension definition of said child component to said parent component.

19. A machine readable memory tangibly embodying instructions executable by a computer to perform a method for maximizing a view of a geometric rendering of a child component within a parent component among a plurality of components in a component family hierarchy, said method comprising:

establishing bi-directional process communications between said child component and said parent component;

generating an ensure visible request from said child component to said parent component;

maximizing said view of all children of said parent components as directed by said parent component that received said ensure visible request by way of parent component offsets adjustments relative to an adjustment of any of said child component for each said parent component having scroll capability; and propagating said ensure visible request to other of said plurality of components throughout said component family hierarchy to a most senior parent component of said component family hierarchy, wherein subsequent iterations of ensure visible event processing treat successive parent components as successive child components up to said most senior parent component;

translating coordinates of said geometric rendering to reflect coordinates recognized by said parent component prior to said step of propagating said ensure visible request;

wherein said step of translating includes:

first step of identifying said coordinates of said geometric rendering;

second step of identifying said parent origin coordinates; and adding a difference between said coordinates of said geometric rendering and said parent origin coordinates to said coordinates of said geometric rendering.

20. A method according to claim 19 including:

establishing a basic ensure visible function in each component of said plurality of components in said component family hierarchy.

21. A method according to claim 20 including:

establishing a scrolling version of said basic ensure visible function in each component of said plurality of components having scroll capability.

22. A machine readable memory tangibly embodying instructions executable by a computer to perform a method for maximizing a view of a geometric rendering of a child component within a parent component among a plurality of components in a component family hierarchy, said method comprising:

establishing bi-directional process communications between said child component and said parent component;

generating an ensure visible request from said child component to said parent component;

maximizing said view of all children of said parent components as directed by said parent component that received said ensure visible request by way of parent component offset adjustments relative to an adjustment of any of said child component for each said parent component having scroll capability;

propagating said ensure visible request to other of said plurality of components throughout said component family hierarchy to a most senior parent component of said component family hierarchy, wherein subsequent iterations of ensure visible event processing treat successive parent components as successive child components up to said most senior parent component;

wherein said step of generating includes:

determining origin coordinates of said geometric rendering;

identifying a dimension definition of said child component characteristic of said geometric rendering; and calling an ensure visible function call of said parent component to pass said origin coordinates of said geometric rendering and said dimension definition of said geometric rendering to an immediate one of said parent component.

23. A machine readable memory tangibly embodying instructions executable by a computer to perform a method for maximizing a view of a geometric rendering of a child component within a parent component among a plurality of components in a component family hierarchy, said method comprising:

establishing bidirectional process communications between said child component and said parent component;

generating an ensure visible request from said child component to said parent component;

maximizing said view of all children of said parent components as directed by said parent component that received said ensure visible request by way of parent component offset adjustments relative to an adjustment of any of said child component for each said parent component having scroll capability; and propagating said ensure visible request to other of said plurality of components throughout said component family hierarchy to a most senior parent component of said component family hierarchy, wherein subsequent iterations of ensure visible event processing treat successive parent components as successive child components up to said most senior parent component;

wherein said step of maximizing includes:

determining if said dimension definition of said child component is of a size that fits within geometric boundaries of said parent component; and clipping said dimension definition of said child component to fit within said geometric boundaries of said parent component in negative response to said step of determining.

24. A machine readable memory tangibly embodying instructions executable by a computer to perform a method for maximizing a view of a geometric rendering of a child component within a parent component among a plurality of components in a component family hierarchy, said method comprising:

establishing bi-directional process communications between said child component and said parent component;

generating an ensure visible request from said child component to said parent component;

maximizing said view of all children of said parent components as directed by said parent component that received said ensure visible request by way of parent component offset adjustments relative to an adjustment of any of said child component for each said parent component having scroll capability; and propagating said ensure visible request to other of said plurality of components throughout said component family hierarchy to a most senior parent component of said component family hierarchy, wherein subsequent iterations of ensure visible event processing treat successive parent components as successive child components up to said most senior parent component;

wherein said step of maximizing includes:
first step of determining if a maximum portion of said child component is within geometric boundaries of said parent component;
scrolling said child component and said view of all children of said parent component within said geometric boundaries of said parent component in negative response to said first step of determining;
second step of determining if said dimension definition of said child component is of a size that fits within said geometric boundaries of said parent component; and
adjusting said dimension definition of said child component and all other children of said parent component to fit within said geometric boundaries of said parent component in negative response to said second step of determining.

25. A machine readable memory tangibly embodying instructions executable by a computer to perform a method for maximizing a view of a geometric rendering of a child component of a parent component among a plurality of components in a component family hierarchy, said method comprising:
first step of establishing a basic ensure visible function in each component of said plurality of components in said component family hierarchy that do not support scroll capabilities among said component family hierarchy;
second step of establishing a scrolling version of said basic ensure visible function in each component of said plurality of components that supports scroll capabilities among said component family hierarchy;
third step of establishing bi-directional communications between said child component and said parent component; and
recursively generating an ensure visible request from one child component to an immediate parent component up through said component family hierarchy to a most senior parent component to maximize said view of said one of said plurality of components along with each other of said plurality of components in said component family hierarchy up through said most senior parent component;
wherein said step of recursively generating said ensure visible request includes:
translating origin coordinates of said geometric rendering of said child component to reflect parent coordinates recognized by said parent component; and
maximizing said view of all children of said parent component as directed by said parent component;
wherein said step of translating includes:
first step of identifying said origin coordinates of said geometric rendering of said child component;
second step of identifying said parent origin coordinates; and
combining said origin coordinates with said parent origin coordinates.

26. A method according to claim 25 wherein said step of maximizing includes:
determining if said dimension definition of said child component is of a size that fits within geometric boundaries of said parent component that does not have scroll capability; and
adjusting said dimension definition of said child component to fit within said geometric boundaries of said parent component in negative response to said step of determining.

27. A method according to claim 25 wherein said step of maximizing includes:
first step of determining if a maximum portion of said child component is within geometric boundaries of said parent component that has scroll capability;
scrolling said child component and said view of all children of said parent component within said geometric boundaries of said parent component in negative response to said first step of determining;
second step of determining if said dimension definition of said child component is of a size that fits within said geometric boundaries of said parent component; and
adjusting said dimension definition of said child component and all other children of said parent component to fit within said geometric boundaries of said parent component in negative response to said second step of determining.

28. A method according to claim 25 wherein said step of generating includes:
determining origin coordinates of said child component;
identifying a dimension definition of said child component characteristic of a geometric shape of said child component; and
calling an ensure visible function call of said parent component to pass said origin coordinates of said child component and said dimension definition of said child component to said parent component.

29. A machine readable memory tangibly embodying instructions executable by a computer to perform a method for maximizing a view of a geometric rendering of a child component of a parent component among a plurality of components in a component family hierarchy, said method comprising:
first step of establishing a basic ensure visible function in each component of said plurality of components in said component family hierarchy that do not support scroll capabilities among said component family hierarchy;
second step of establishing a scrolling version of said basic ensure visible function in each component of said plurality of components that supports scroll capabilities among said component family hierarchy;
third step of establishing bi-directional communications between said child component and said parent component; and
recursively generating an ensure visible request from one child component to an immediate parent component up through said component family hierarchy to a most senior parent component to maximize said view of said one of said plurality of components along with each other of said plurality of components in said component family hierarchy up through said most senior parent component;
wherein said step of recursively generating said ensure visible request includes:
translating origin coordinates of said geometric rendering of said child component to reflect parent coordinates recognized by said parent component; and
maximizing said view of all children of said parent component as directed by said parent component;
wherein said step of maximizing includes:
determining if said dimension definition of said child component is of a size that fits within geometric boundaries of said parent component that does not have scroll capability; and
adjusting said dimension definition of said child component to fit within said geometric boundaries of said parent component in negative response to said step of determining.

30. A machine readable memory tangibly embodying instructions executable by a computer to perform a method for maximizing a view of a geometric rendering of a child component of a parent component among a plurality of components in a component family hierarchy, said method comprising:

first step of establishing a basic ensure visible function in each component of said plurality of components in said component family hierarchy that do not support scroll capabilities among said component family hierarchy;

second step of establishing a scrolling version of said basic ensure visible function in each component of said plurality of components that supports scroll capabilities among said component family hierarchy;

third step of establishing bi-directional communications between said child component and said parent component; and recursively generating an ensure visible request from one child component to an immediate parent component up through said component family hierarchy to a most senior parent component to maximize said view of said one of said plurality of components along with each other of said plurality of components in said component family hierarchy up through said most senior parent component;

wherein said step of recursively generating said ensure visible request includes:
translating origin coordinates of said geometric rendering of said child component to reflect parent coordinates recognized by said parent component; and
maximizing said view of all children of said parent component as directed by said parent component;
wherein said step of maximizing includes:
first step of determining if a maximum portion of said child component is within geometric boundaries of said parent component that has scroll capability;
scrolling said child component and said view of all children of said parent component within said geometric boundaries of said parent component in negative response to said first step of determining;
second step of determining if said dimension definition of said child component is of a size that fits within said geometric boundaries of said parent component; and
adjusting said dimension definition of said child component and all other children of said parent component to fit within said geometric boundaries of said parent component in negative response to said second step of determining.

31. A machine readable memory tangibly embodying instructions executable by a computer to perform a method for maximizing a view of a geometric rendering of a child component of a parent component among a plurality of components in a component family hierarchy, said method comprising:

first step of establishing a basic ensure visible function in each component of said plurality of components in said component family hierarchy that do not support scroll capabilities among said component family hierarchy;

second step of establishing a scrolling version of said basic ensure visible function in each component of said plurality of components that supports scroll capabilities among said component family hierarchy;

third step of establishing bi-directional communications between said child component and said parent component; and recursively generating an ensure visible request from one child component to an immediate parent component up through said component family hierarchy to a most senior parent component to maximize said view of said one of said plurality of components along with each other of said plurality of components in said component family hierarchy up through said most senior parent component;

wherein said step of generating includes:
determining origin coordinates of said child component;
identifying a dimension definition of said child component characteristic of a geometric shape of said child component; and
calling an ensure visible function call of said parent component to pass said origin coordinates of said child component and said dimension definition of said child component to said parent component.

* * * * *